Figure 1:
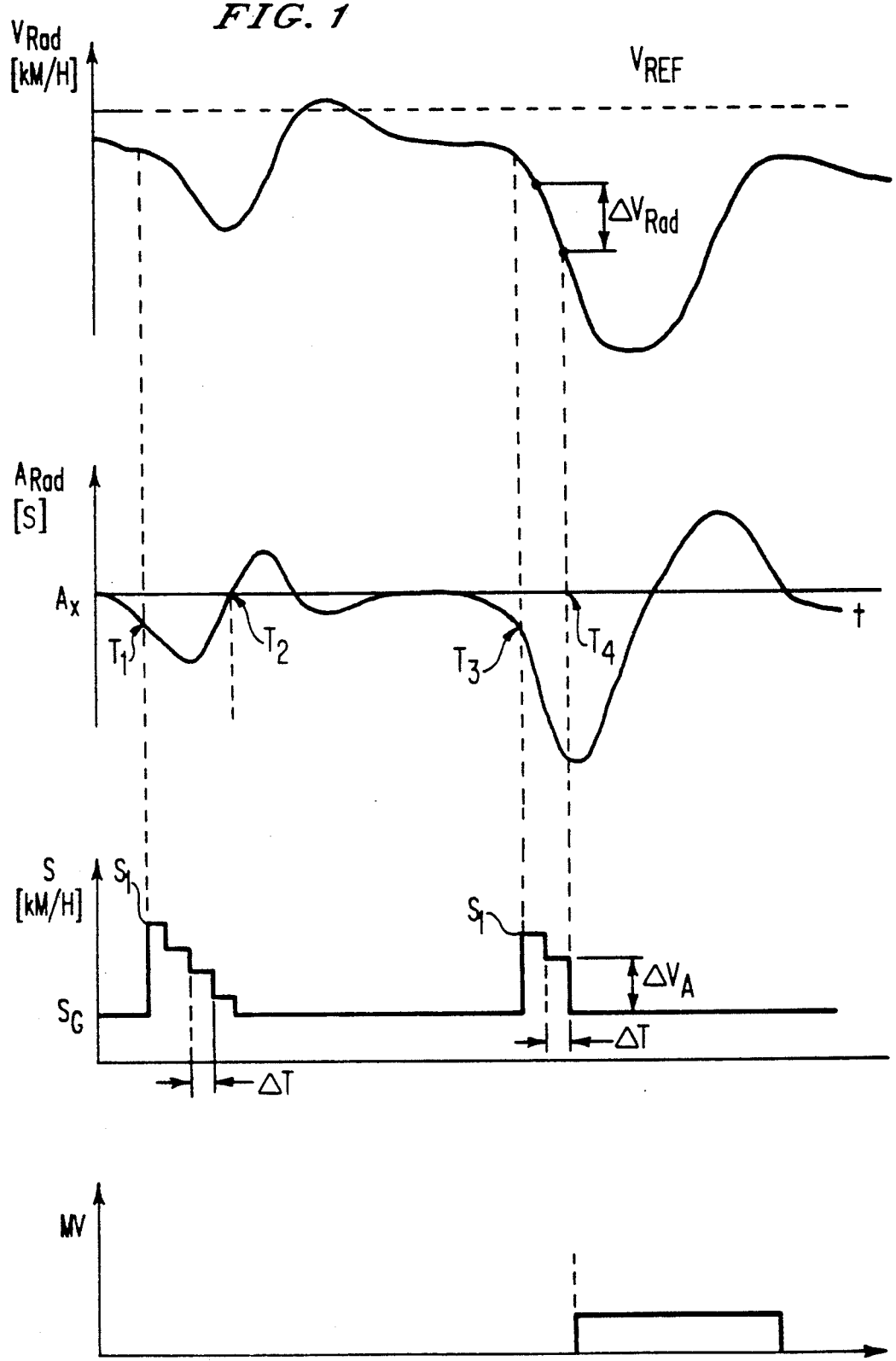

United States Patent [19]

Kampfmann et al.

[11] Patent Number: 5,249,850
[45] Date of Patent: Oct. 5, 1993

[54] CONTROL OF ABS THRESHOLD WITHOUT ACCOMPANYING REDUCTION OF BRAKE PRESSURE

[75] Inventors: Wolfgang Kampfmann, Moselkern; Dieter Voges, Koblenz; Volker Braschel, Neuwied, all of Fed. Rep. of Germany

[73] Assignee: Lucas Industries public limited company, Solihull, England

[21] Appl. No.: 791,735

[22] Filed: Sep. 30, 1991

[30] Foreign Application Priority Data

Oct. 12, 1990 [DE] Fed. Rep. of Germany ....... 4032506

[51] Int. Cl.$^5$ .......................... B60T 8/32; B60T 8/78
[52] U.S. Cl. .................................... 303/103; 303/105; 303/93; 364/426.02
[58] Field of Search ................. 303/93, 94, 100, 105, 303/106, 109, 110, 103; 364/426.02–426.03

[56] References Cited

U.S. PATENT DOCUMENTS

| Re. 31,383 | 9/1983 | Leiber et al. ..................... 303/95 X |
| 4,140,353 | 2/1979 | Riordan ............................ 303/97 |
| 4,675,819 | 6/1987 | Fennel ............................ 303/105 X |
| 4,701,855 | 10/1987 | Fennel ............................ 303/105 X |
| 4,739,484 | 4/1988 | Fennel ............................ 303/103 X |
| 4,938,544 | 7/1990 | Braschel et al. ................. 303/105 X |

FOREIGN PATENT DOCUMENTS 0330064  8/1989  European Pat. Off. .
2227534  8/1990  United Kingdom .

Primary Examiner—Robert J. Oberleitner
Assistant Examiner—Josie A. Ballato
Attorney, Agent, or Firm—Oblon, Spivak, McClelland, Maier & Neustadt

[57] ABSTRACT

In a method of controlling the brake pressure of a vehicle brake system equipped with anti-lock protection it is provided to measure the slip and/or rotational retardation of a wheel whose brake is applied and to compare each measured value with a given threshold value so as to lower the brake pressure if the threshold value proves to have been surpassed. Undesired pressure reductions can be avoided by increasing the threshold value for given periods of time from a basic value ($S_G$) and subsequently decreasing it again. At a point in time $T_1$ at which the rotational retardation of the braked wheel is greater than a value corresponding to a physically feasible slowdown of the vehicle the threshold value is increased abruptly, to be decreased thereafter according to a predetermined function of time. During the lowering of the threshold value the change in speed of the retarded wheel is measured over given intervals of time $\Delta T$ and compared with the instantaneous higher threshold value. If the comparison demonstrates that the change in speed in question is greater than the instantaneous raise in threshold value, the threshold value is reduced to the basic value ($S_G$).

1 Claim, 2 Drawing Sheets

CONTROL OF ABS THRESHOLD WITHOUT ACCOMPANYING REDUCTION OF BRAKE PRESSURE

The invention relates to a method of controlling the brake pressure in an anti-lock vehicle brake system, wherein the slip and/or rotational retardation of a retarded wheel is measured and compared with a predetermined threshold value so as to reduce the brake pressure if said value is exceeded, and wherein the threshold value is raised for predetermined periods of time from a basic value and then lowered again to the basic value so as to avoid unnecessary pressure reductions.

In vehicle brake systems equipped with anti-lock protection means the rotation of each individual wheel of the vehicle is monitored constantly and especially the slip of the retarded wheels and their retardation are determined in order to discover any tendency of the wheel to become locked and prevent such locking. As soon as the slip of the wheel or its retardation indicate impending locking, a circumstance determined by certain given threshold values being exceeded in respect of slip and/or retardation, any further rise of the pressure in the brake of the affected wheel is prevented or the brake pressure is reduced.

The pressure in the brake is augmented once more so as to achieve further braking action by the respective wheel as soon as the wheel has experienced sufficient rotational acceleration due to its friction on the road surface.

With any kind of anti-lock control of the brake pressure the essential point is to have the wheels at which the brakes are applied, i.e. the retarded wheels rotate in the most favorable range of the known coefficient of friction/slip curve during all the control cycles of a braking action.

The anti-lock system should respond as sensitively as possible and without delay to such changes in the rotational behavior of the retarded wheel as indicate a tendency of the wheel becoming locked since this will permit braking with the shortest possible distance to stop while maintaining steerability of the vehicle. To accomplish that, it would be desirable to adjust the threshold values mentioned as sensitively as possible, in other words such that a control cycle including a reduction of the brake pressure will be initiated early on when there are only minor changes in the rotational behavior of the wheel pointing in the direction of a risk of locking.

However, the sensitive adjustment of the threshold values is opposed by the fact that retarded wheels under certain conditions, which are not unlikely, may demonstrate a rotational behavior which indicates a strong rotational deceleration although the wheel still is moving in a condition such as to be well capable of being slowed down. This phenomenon is well known and described in detail, for instance, in DE-OS 33 45 729. It is in particular oscillations of the axles which may cause relatively great differences between the velocities of the vehicle and of the wheels, mimicking unstable running of a wheel and, therefore, releasing undesirable control operations, such as an undesired reduction of the brake pressure. Furthermore, when a retarded wheel moves through a pothole or on uneven ground, a sharp rotational acceleration followed by great deceleration may occur.

Such axial oscillations and the like thus may have the consequence that tightly set threshold values in respect of the rotational retardation of the wheel are exceeded and an undesired control operation (pressure reduction at the retarded wheel) is initiated although there actually is no risk that the wheel will become locked.

DE-OS 33 45 729 which is the point of departure in defining the instant invention provides that undesired control operations be suppressed by varying the threshold value, which is decisive for initiating control, in response to the startup acceleration of the wheel under control. To accomplish that, the startup acceleration of the retarded wheel (in other words the renewed acceleration of the wheel after a deceleration) is monitored constantly and when it surpasses a predetermined limit value, the critical threshold value for release of a control operation, i.e. pressure reduction in the brake of the wheel, is changed. The variation of the threshold value is made in response to the degree of renewed acceleration. Thus the threshold value is increased momentarily to the value which results from the re-acceleration and then is left to die down (exponentially or linearly) at a given function of time to the basic value. The basic threshold value is the threshold value usually adopted by the system, in other words when the re-acceleration of the wheel remains below the above mentioned limit value or when no control takes place.

U.S. Pat. No. 4,140,353 likewise describes a method of effecting braking with anti-lock control, wherein the threshold value responsible for the control is adjusted in response to the magnitude of renewed acceleration of a retarded wheel.

DE 38 05 270 A1 and the corresponding EP 0 329 071 A2 disclose a brake pressure control method for use in an anti-lock vehicle brake system, wherein the threshold value is increased briefly by a constant amount with respect to a basic threshold value at the beginning of a pressure reduction or pressure increase during a control cycle so as to avoid undesirable control operations caused by oscillations of axles, potholes, and the like. Subsequently the threshold value is lowered once more in response to the period of time of the pressure reduction in the preceding control cycle.

Further specific problems which anti-lock control systems, the so-called ABS must solve, apart from the axial oscillations mentioned, are caused by gravel road surfaces or macadam and snow on the roadway. Such road surfaces cause quick wheel movements and thus the generation of pressure reduction signals in conventional ABS control algorithms although the wheel has not yet entered a critical slip range which does require a reduction in pressure. In this manner distance to stop is given away, in other words the vehicle is slowed down less than would have been possible under the conditions.

The invention aims at improving known ABS control algorithms so that bad road surfaces, such as especially gravel or snow on the road will not lead to the vehicle being retarded insufficiently. It is also an object of the invention to devise the control algorithm such as to prevent undesired pressure reduction signals from occurring due to bad roadways and, at the same time, permit a sensitive response of the ABS control on smooth road surfaces.

To obtain such an improvement in ABS control it is provided, in accordance with the invention, that the threshold value be increased abruptly to a momentary threshold level, and then be decreased according to a predetermined function of time, at a moment at which the rotational retardation of the retarded wheel is greater than the maximum deceleration physically possible due to braking of the vehicle, that the change in speed of the retarded wheel over, predetermined time intervals be measured during the decrease of the threshold value, and compared with the instantaneous threshold value, and that the instantaneous threshold value be lowered to the basic value if the comparison reveals that the change in wheel speed is greater than the instantaneous threshold value.

The invention thus provides, first, to determine whether or not the rotational retardation of a retarded wheel exceeds a predetermined deceleration threshold value, such exceeding being clearly above the maximum slow-down of the vehicle which is physically feasible. The maximum physically possible deceleration of a vehicle can be determined for any vehicle, assuming that the brakes are applied with good tires and on a good road surface. If the rotational retardation of a wheel reaches values which are higher than the physically feasible maximum slow-down of the vehicle that is an indication that the wheel brakes are applied excessively and there is a risk that the wheel will become locked.

In accordance with the invention the threshold value, e.g. in respect of the slip of the retarded wheel is increased abruptly when the deceleration of a retarded wheel is greater than would correspond to the physically possible deceleration of the vehicle.

This brief increase of the threshold value renders the ABS control less sensitive for a short time, i.e. the values of slip and/or retardation of the wheel may assume rather high levels without necessarily entailing a reduction in pressure.

Subsequently the threshold value thus raised sharply is lowered continually, for instance in accordance with a stepped function of time, as long as the wheel deceleration remains above a value corresponding to the physically feasible maximum deceleration of the vehicle. If the wheel recovers rather quickly a reduction will not occur in the brake pressure during such relatively brief great wheel deceleration because the slip of the wheel (or another control magnitude) does not exceed the temporarily increased threshold value. Such a course of the rotational retardation of the wheel at which the brakes are applied was found to be typical of a stretch of bad roadway by the invention. In accordance with the invention that will no longer lead to insufficient retarding or underbraking of the wheel.

On the other hand, the invention must make sure that the ABS control is sufficiently sensitive to warrant a short distance to stop, at good steerability of the vehicle, when a very smooth roadway leads to high rotational deceleration of the wheel, calling for pressure reduction.

To accomplish that, it is provided according to the invention that the instantaneous sharp increase of the threshold value effected initially is cancelled at once unless the retarded wheel "recovers" within a relatively short time span, i.e. the threshold value is lowered again to its basic value when indications exist that the wheel is on a surface which has a very low coefficient of friction. An indication taken into account according to the invention of such a condition is the change in speed of the retarded wheel over respective very short predetermined time intervals which clearly are shorter than a typical control cycle. The speed variation of the retarded wheel is measured over each of these successive rather short intervals of time and compared with the threshold value adjusted at the time. If it is determined in the comparison that the speed variation of the retarded wheel is greater than the slip threshold value this indicates that the reason by no means is gravel or snow but that instead the wheel indeed is located on a surface which has a rather bad coefficient of friction. Then the originally set increase of the threshold value is cancelled at once, i.e. the threshold value is lowered once more to the basic value which is the starting point for normal ABS control. In other words, the basic threshold value corresponds to the desired sensitivity of the ABS control algorithm on roadways which are not characterized by an unusual road surface, such as gravel or snow, and the like.

An embodiment of the invention will be described in greater detail below with reference to the drawings wherein.

Figure 2:
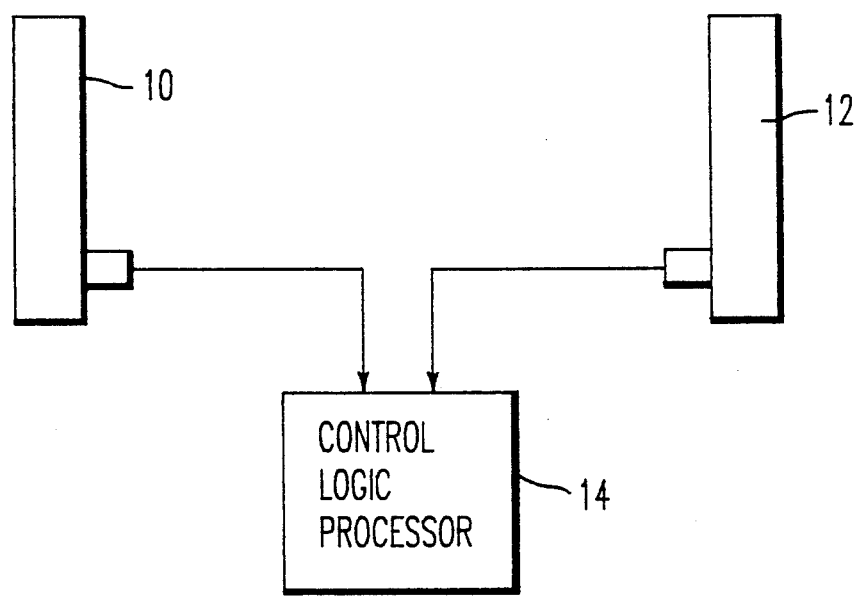

FIG. 1 is a graphical representation showing the operating characteristics of the method of the present invention; and FIG. 2 is a schematic view showing a logic block for control of vehicle wheel brakes in response to wheel speed in accordance with the invention.

In it, it is assumed that the ABS control algorithm specified in accordance with the invention is implemented by some up-to-date art in that a control logic processor 14 is programmed to control brakes of wheels 10, 12 in accordance with the algorithm. All the hardware components needed to realize the invention, such as processors, valves, control means, etc. are generally known in the ABS art. The algorithm will be defined below in common language rather than by resorting to a programming language or a flowchart.

The first figure shows four different curves above the same time axis (t). The topmost graph illustrates the wheel speed $V_{Rad}$ (e.g. expressed in km/h) in the course of time. The continuous line is a typical course of the wheel speed $V_{Rad}$. The discontinuous line corresponds to the vehicle reference speed which is known as such and which should be as close as possible to the actual velocity of the vehicle above ground.

The curve below shows the wheel retardation belonging to the wheel speed $V_{Rad}$ shown, plotted above the same time scale, and resulting as a first derivative of the wheel speed above time.

The next lower curve shows the course of the threshold value according to the invention, this being threshold value S with respect to slip of the retarded wheel for the embodiment illustrated.

The lowermost graph in the figure presents the control of a magnetic valve MV upon actuation of which a pressure reduction takes place at the retarded wheel due to the opening of the valve.

With the course of ABS control as illustrated in the figure it is assumed that, at point in time $T_1$, the rotational deceleration of the retarded wheel clearly exceeds a critical value $A_x$, in other words the wheel whose brakes are applied is retarded more than would correspond to the maximum physically feasible vehicle deceleration of the given vehicle. Therefore, the threshold value S is increased abruptly to a momentary level $S_1$ according to the invention at time $T_1$ (see the third curve). This means that the ABS control is less sensitive since surpassing of the threshold value will require greater slip or greater rotational retardation of the vehicle. In the embodiment illustrated the threshold value is entered in respect of the slip. In addition or instead a threshold value might be plotted which relates to the rotational retardation.

It is assumed in the drawings that the wheel "recovers" rather quickly, i.e. is accelerated once more, from time $T_1$ to time $T_2$, during the first decrease of the retardation below the critical value $A_x$. During the period of time during which the rotational retardation $A_{Rad}$ surpasses the critical value $A_x$ the threshold value S is lowered according to a stepped function. Time intervals $\Delta T$ are set for the steps, one such time interval $\Delta T$ being selected so that it corresponds to a fraction of a typical duration of a control cycle.

When the retardation $A_{Rad}$ of the retarded wheel no longer exceeds the critical value $A_x$ (time $T_2$) the threshold value S is lowered once more to the basic threshold value $S_G$, as shown in the figure.

At time $T_3$ the retarded wheel again experiences a retardation $A_{Rad}$ which is greater than the critical value $A_x$. For this reason the threshold value once more is again abruptly increased from the basic value $S_G$ to the same maximum value $S_1$ shown in the figure and then lowered in steps corresponding to the time intervals $\Delta T$. The change in rotational speed $V_{Rad}$ of the retarded wheel during these time intervals is measured for each of these steps corresponding to the time intervals $\Delta T$. This change in speed $\Delta V_{Rad}$ is plotted in the first curve shown in the figure. This change in speed $\Delta V_{Rad}$ is compared with the increased threshold value $\Delta V_A$ valid at this time. A comparison is possible as the dimensions are the same of the change in speed $\Delta V_{Rad}$ and the change in threshold value $\Delta V_A$. At time $T_4$ the change in speed $\Delta V_{Rad}$ of the retarded wheel determined during the preceding time interval $\Delta T$ is compared with the currently valid increase of the threshold value $(\Delta V_A)$. As the rotational retardation is great and lasts relatively long the comparison shows that the change in speed of the retarded wheel during time interval $\Delta T$ is greater than the threshold value increase prevailing at this instant and that is an indication of a smooth roadway (rather than of measuring results influenced by gravel or snow). At time $T_4$, therefore, the threshold value S is reduced at once to the "normal" basic threshold value $S_G$. This basic threshold value $S_G$ is so sensitive that at this point in time the slip of the wheel, i.e. conventionally the difference between the rotational speed of the wheel and the reference speed $V_{Ref}$, is greater than the threshold value so that pressure reduction is initiated at once. In other words the magnetic valve MV shown in the drawing is actuated in order to relieve the hydraulic pressure in the brake cylinder.

Modifications can be made to the embodiment described of an ABS control algorithm for filtering out ends of bad road surface, such as gravel or snow, and the like. With the embodiment specified, the threshold value S is raised from the basic threshold value $S_G$ to a given maximum value at times $T_1$ and $T_3$, in order to be lowered subsequently according to a stepped function. The threshold value also may be decreased continually instead of in steps. In that event differences ($\Delta V_{Rad}$ and $\Delta V_A$) will no longer be compared but instead differential quotients, i.e. the respective instantaneous value of the time derivative of the wheel speed and a corresponding threshold value. It is preferred to apply the invention when the pressure increasing speeds are relatively low.

Furthermore, the amount by which the threshold value is increased may be variable, being varied and limited in response to measured parameters.

What is claimed is:

1. In a method of controlling brake pressure in an anti-lock vehicle brake system wherein the slip of a braked wheel is measured, said measured slip is compared with a predetermined threshold value, and the brake pressure is reduced if, according to said comparison, the measured slip exceeds the threshold value, the invention comprising the steps of (1) measuring for each of a sequence of consecutive time intervals a rotational retardation of said braked wheel, (2) comparing said measured rotational retardation of the braked wheel with a maximum physically possible braked deceleration of the vehicle, (3) abruptly increasing said threshold value from a basic threshold value ($S_G$) to a higher momentary threshold value ($S_1$) when the measured rotational retardation of the braked wheel is greater than that maximum physically possible braked deceleration of the vehicle and then lowering the increased threshold from said higher momentary threshold value ($S_1$) according to a predetermined function of time but without at this stage reducing the brake pressure, (4) measuring, at any moment during said lowering of the increased threshold value, change in speed ($\Delta V_{Rad}$) of the braked wheel over a predetermined time interval ($\Delta T$), (5) determining a difference ($\Delta V_A$) between said increased threshold value and said basic threshold value ($S_G$), (6) comparing said measured change in wheel speed ($\Delta V_{Rad}$) with said determined difference ($\Delta V_A$) between said increased threshold value and said basic threshold value ($S_G$), and (7) lowering said increased threshold value to the basic threshold value ($S_G$) when said comparison of the change in speed ($\Delta V_{Rad}$) with the difference ($\Delta V_A$) between said increased threshold value and said basic threshold value ($S_G$) reveals that said change in speed ($\Delta V_{Rad}$) is greater than said difference between said increased threshold value and the basic threshold value ($S_G$).

* * * * *